US011349362B2

(12) United States Patent
Ohzu et al.

(10) Patent No.: US 11,349,362 B2
(45) Date of Patent: May 31, 2022

(54) ROTOR

(71) Applicant: HONDA MOTOR CO., LTD., Tokyo (JP)

(72) Inventors: Tatsuya Ohzu, Saitama (JP); Masato Kawano, Saitama (JP); Noriaki Fujita, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 16/597,349

(22) Filed: Oct. 9, 2019

(65) Prior Publication Data

US 2020/0119608 A1 Apr. 16, 2020

(30) Foreign Application Priority Data

Oct. 10, 2018 (JP) .............................. JP2018-192068

(51) Int. Cl.
*H02K 1/32* (2006.01)
*H02K 1/27* (2022.01)
*H02K 1/276* (2022.01)

(52) U.S. Cl.
CPC ............... *H02K 1/32* (2013.01); *H02K 1/276* (2013.01)

(58) Field of Classification Search
CPC ......... H02K 1/276; H02K 1/32; H02K 1/2766
USPC .......................................................... 310/61
See application file for complete search history.

(56) References Cited

U.S. PATENT DOCUMENTS

| 2007/0052313 A1* | 3/2007 | Takahashi | ................ H02K 1/32 310/156.53 |
|---|---|---|---|
| 2009/0015081 A1* | 1/2009 | Takenaka | ................ H02K 9/19 310/54 |
| 2012/0256516 A1 | 10/2012 | Matsushita et al. | |

(Continued)

FOREIGN PATENT DOCUMENTS

| CN | 102714437 A | 10/2012 |
|---|---|---|
| JP | 2008-086130 A | 4/2008 |

(Continued)

OTHER PUBLICATIONS

Jun. 30, 2020, Japanese Office Action issued for related JP application No. 2018-192068.

(Continued)

*Primary Examiner* — Alex W Mok
(74) *Attorney, Agent, or Firm* — Paratus Law Group, PLLC (57) ABSTRACT

A rotor includes: a rotor core having a rotor shaft hole into which a rotor shaft is tightened and a plurality of magnet insertion holes provided along a circumferential direction; and a plurality of magnetic pole portions constituted by magnets inserted into the magnet insertion holes. The rotor core includes a cooling portion having a plurality of refrigerant flow passage holes provided radially inward of the plurality of magnetic pole portions and arranged along a circumferential direction, the plurality of refrigerant flow passage holes are arranged on both circumferential end portion sides of each magnetic pole portion, the refrigerant flow passage hole includes an inner radial side apex portion protruding radially inward, and an outer peripheral wall of the refrigerant flow passage hole includes an outer radial side apex portion protruding radially outward.

4 Claims, 8 Drawing Sheets

(56) References Cited

U.S. PATENT DOCUMENTS

| | | | | |
|---|---|---|---|---|
| 2013/0020889 A1* | 1/2013 | Yamamoto | ........... | H02K 1/2766 |
| | | | | 310/59 |
| 2013/0221772 A1* | 8/2013 | Miyamoto | ............... | H02K 1/32 |
| | | | | 310/54 |
| 2016/0006307 A1 | 1/2016 | Yokota et al. | | |
| 2018/0062463 A1* | 3/2018 | Ito | ........................... | H02K 1/24 |
| 2020/0099265 A1 | 3/2020 | Yoshizawa | | |

FOREIGN PATENT DOCUMENTS

| | | |
|---|---|---|
| JP | 2009-011011 A | 1/2009 |
| JP | 2010-081657 A | 4/2010 |
| JP | 2013-183481 A | 9/2013 |
| JP | 2014-155243 A | 8/2014 |
| JP | 2017-046545 A | 3/2017 |
| JP | 2017-184343 A | 10/2017 |
| WO | WO 2014/174579 A1 | 10/2014 |
| WO | WO 2018/181244 A1 | 10/2018 |

OTHER PUBLICATIONS

Jun. 2, 2021, Chinese Office Action issued for related CN application No. 201910957535.0.

\* cited by examiner

ROTOR

CROSS-REFERENCE TO RELATED APPLICATIONS

The present application claims the benefit of priority of Japanese Patent Application No. 2018-192068, filed on Oct. 10, 2018, the content of which is incorporated herein by reference.

TECHNICAL FIELD

The present invention relates to a rotor of an electric rotary machine.

BACKGROUND ART

In JP-A-2010-081657, a rotor which includes a rotor shaft hole into which a rotor shaft is tightened, a refrigerant flow passage hole provided radially outside the rotor shaft hole and having a plurality of hole portions arranged in a circumferential direction, and an electromagnetic portion provided radially outside the refrigerant flow passage hole and having a plurality of magnet insertion holes into which magnets are respectively inserted has been disclosed.

JP-A-2010-081657 describes that a refrigerant flowing through the refrigerant flow passage hole provided in the rotor core is supplied to a coil end using a centrifugal force generated by rotation of the rotor.

With the upsizing of an electric rotary machine in recent years, the decrease in performance of the electric rotary machine due to heat generation of the magnet cannot be ignored and a method for efficiently cooling the magnet is being sought. The rotor described in JP-A-2010-081657 cools coils of a stator and does not cool the magnet disposed in the rotor. Therefore, the refrigerant flow passage hole described in JP-A-2010-081657 cannot be diverted as it is. In order to cool the magnet placed on the rotor, it is necessary to bring the refrigerant flow passage hole closer to the magnet. However, when refrigerant supply holes are arranged in a vicinity of the magnetic pole portion, there is a possibility that the refrigerant supply holes may be deformed by a tightening load of the rotor shaft to the rotor shaft hole and an outer peripheral portion of the rotor core may be deformed.

SUMMARY

The invention provides a rotor having excellent cooling performance while suppressing deformation of an outer peripheral portion of a rotor core due to a tightening load of a rotor shaft.

According to an aspect of the invention, there is provided a rotor including: a rotor core having a rotor shaft hole into which a rotor shaft is tightened and a plurality of magnet insertion holes provided along a circumferential direction; and a plurality of magnetic pole portions constituted by magnets inserted into the magnet insertion holes, wherein: the rotor core includes a cooling portion having a plurality of refrigerant flow passage holes provided radially inward of the plurality of magnetic pole portions and arranged along a circumferential direction; the plurality of refrigerant flow passage holes are arranged on both circumferential end portion sides of each magnetic pole portion; the refrigerant flow passage hole includes an inner radial side apex portion protruding radially inward; and an outer peripheral wall of the refrigerant flow passage hole includes an outer radial side apex portion protruding radially outward.

Effects

According to the invention, since the refrigerant flow passage hole includes the inner radial side apex portion protruding radially inward, the inner radial side apex portion is deformed so as to be pushed radially outward with respect to the tightening load of the rotor shaft. As a result, since it is possible to absorb the tightening load of the rotor shaft and to suppress the deformation of the outer peripheral portion of the rotor core, it becomes possible to arrange the refrigerant flow passage hole further on the outer peripheral side of the rotor core, and thus the cooling performance of the rotor is improved. Also, since the outer peripheral wall of the refrigerant flow passage hole includes the outer radial side apex portion protruding radially outward, the refrigerant flow path can be formed further on the outer peripheral side of the rotor core, and thus the cooling performance of the rotor is improved.

DESCRIPTION OF EMBODIMENTS

Hereinafter, an embodiment of the invention will be described based on the accompanying drawings.

[Rotor Core]

A rotor core 1 is configured by laminating a plurality of electromagnetic steel plates in an axial direction of a rotor shaft 2 and constitutes a rotor 100 of a motor together with the rotor shaft 2 and a plurality of magnets 3 assembled to the rotor core 1.

Figure 1:
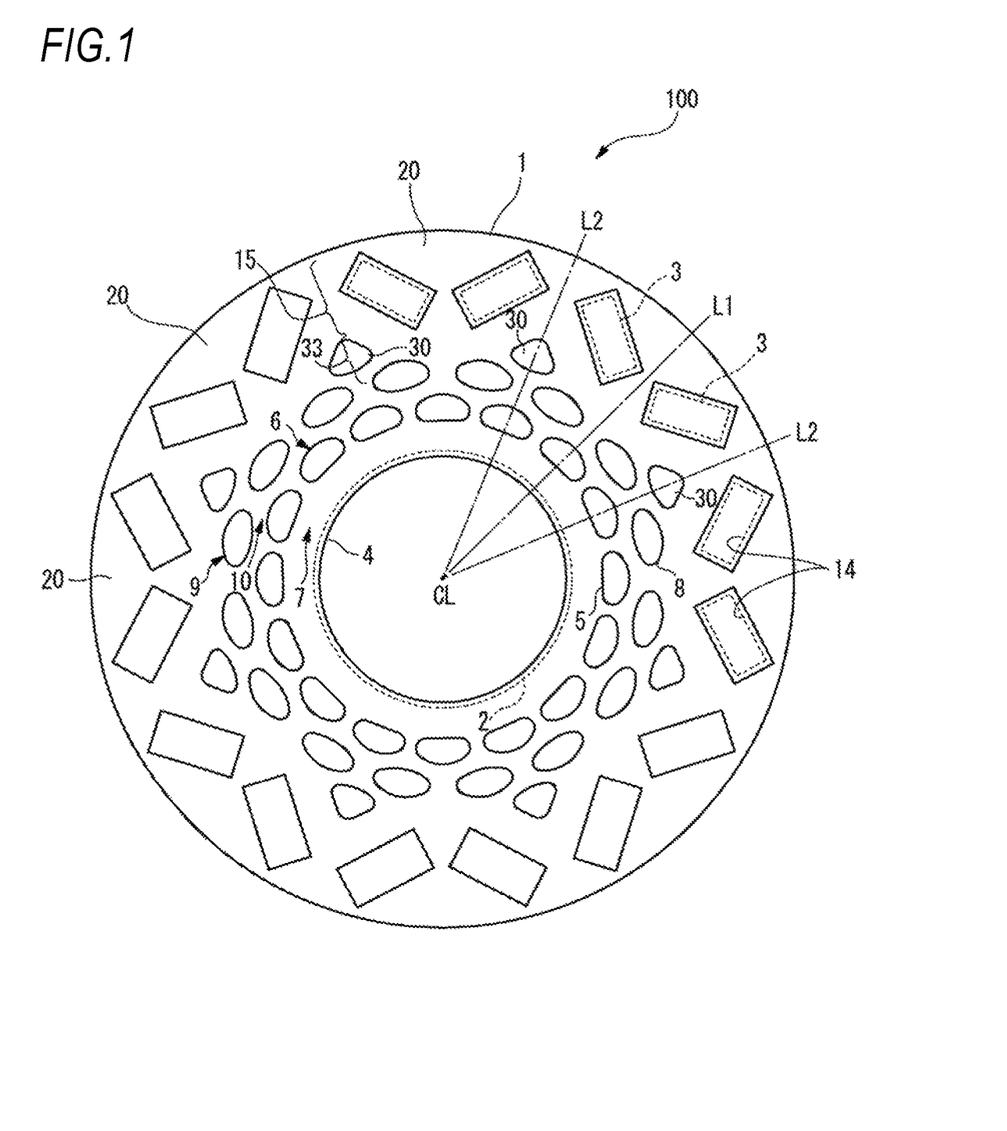
FIG. 1 is a front view of a rotor core according to a first embodiment of the invention.

As illustrated in FIG. 1, the rotor core 1 has an annular shape in which a rotor shaft hole 4 into which the rotor shaft 2 is tightened by press-fitting is provided at a center CL. The rotor core 1 includes a first hole portion group 6 having a plurality of hole portions 5 provided on the outer side of the rotor shaft hole 4 in a radial direction and arranged in a circumferential direction and a shaft holding portion 7 provided between the rotor shaft hole 4 and the first hole portion group 6 in the radial direction. Further, the rotor core 1 includes a second hole portion group 9 having a plurality of hole portions 8 provided on the outer side of the first hole portion group 6 in the radial direction and arranged in the circumferential direction and an annular portion 10 provided between the first hole portion group 6 and the second hole portion group 9 in the radial direction. Further, the rotor core 1 includes a cooling portion 33 having a plurality of refrigerant flow passage holes 30 provided on the outer side of the second hole group 9 in the radial direction and arranged in the circumferential direction and an electromagnetic portion 15 provided on the outer side of the refrigerant flow passage holes 30 in the radial direction and having a plurality of magnet insertion holes 14 into which the magnets 3 are respectively inserted.

[Electromagnetic Portion]

The electromagnetic portion 15 is disposed on the outer peripheral portion of the rotor core 1 and faces a stator (not illustrated). In the electromagnetic portion 15, a plurality of magnetic pole portions 20 are formed at equal intervals along the circumferential direction. Each magnetic pole portion 20 is constituted of two magnets 3 inserted into two magnet insertion holes 14 arranged in a substantially V-shape which opens outward in the radial direction. The magnet 3 is, for example, a permanent magnet such as neodymium magnet. The magnetic pole portion 20 is preferably configured such that a circumferential center portion is located radially inward of the rotor core 1 with respect to both circumferential end portions. For example, the magnetic pole portion 20 may be constituted of three magnets inserted into three magnet insertion holes arranged in a substantially arc shape convex radially inward or the magnetic pole portion 20 may be constituted by one arc magnet arranged in one magnet insertion hole formed in an arc shape convex radially inward.

[Cooling Portion]

The cooling portion 33 is disposed radially inward of the electromagnetic portion 15 and has a plurality of refrigerant flow passage holes 30 disposed along the circumferential direction. The refrigerant flow passage hole 30 communicates with a refrigerant supply passage (not illustrated) provided inside the rotor shaft 2 and the refrigerant flows from one side of the refrigerant flow passage hole 30 to the other side in the axial direction, in such a manner that the magnet 3 located at each magnetic pole portion 20 is cooled. The refrigerant may flow from the center of the refrigerant flow passage hole 30 to both sides in the axial direction to cool the magnet 3 disposed in each magnetic pole portion 20. The refrigerant which cooled the magnet 3 disposed in each magnetic pole portion 20 may be discharged to the outside from the end surface of the rotor core 1 or may return to the rotor shaft 2.

[Arrangement of Refrigerant Flow Passage Hole]

Figure 2:
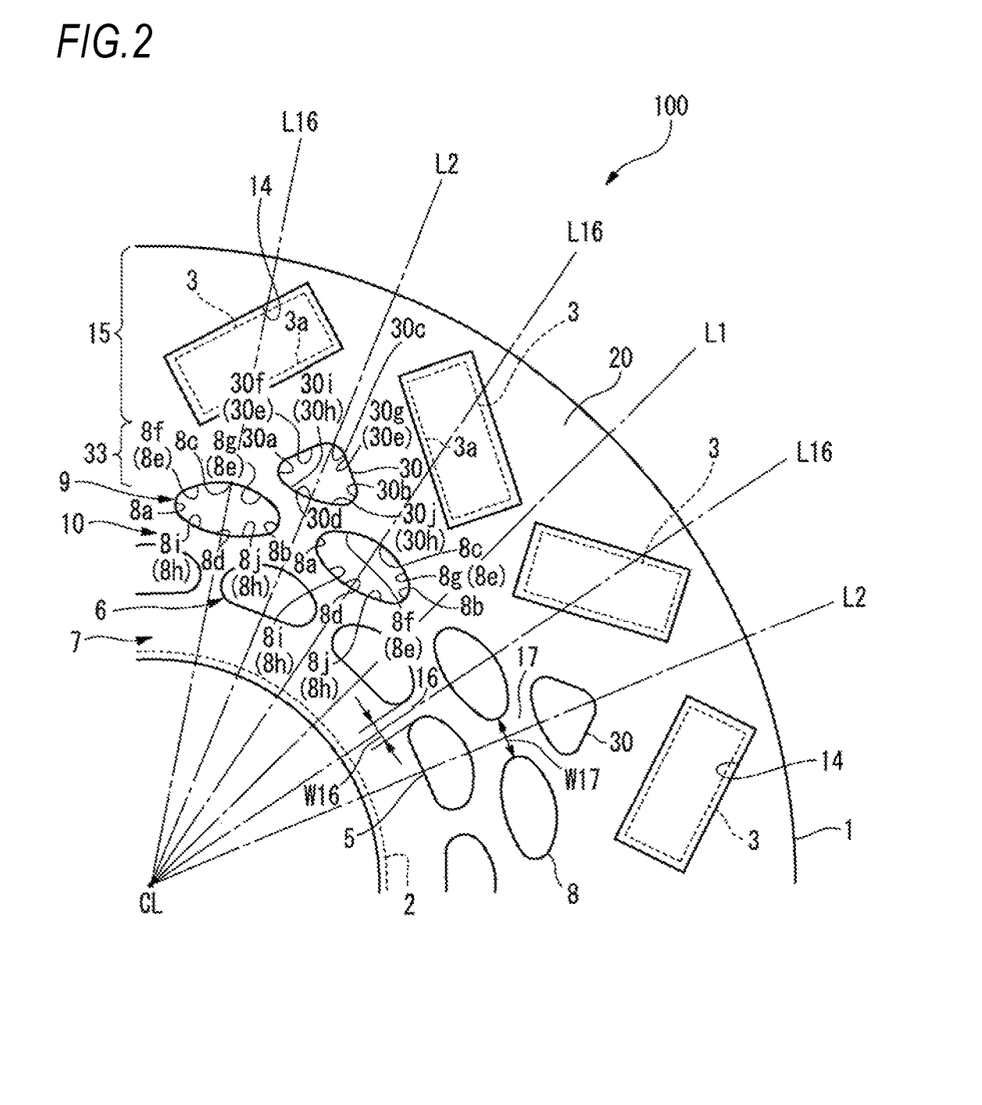
FIG. 2 is a partially enlarged view of FIG. 1.

The refrigerator flow passage hole 30 is located on a virtual line L2 passing through the circumferential end portion of each magnetic pole portion 20 and the center CL of the rotor core 1 such that the refrigerant flow passage holes 30 are symmetrical with respect to a virtual line L1 connecting the center of each magnetic pole portion 20 and the center CL of the rotor core 1. The virtual line L1 coincides with a d-axis, which is the center axis of the magnetic pole portion 20, and the virtual line L2 coincides with a q-axis, which is 90 degrees apart from the d-axis by an electrical angle.

Among both circumferential end portions of the magnetic pole portion 20, the refrigerant flow passage hole 30 located on a circumferential first end portion side is in common with the refrigerant flow passage hole 30 located on a circumferential second end portion side of the magnetic pole portion 20 adjacent to the circumferential first end portion side. In addition, among both circumferential end portions of the magnetic pole portion 20, the refrigerant flow passage hole 30 located on the circumferential second end portion side is in common with the refrigerant flow passage hole 30 located on the circumferential first end portion side of the magnetic pole portion 20 adjacent to the circumferential second end portion side.

Therefore, the refrigerant flows to the refrigerant flow passage hole 30, and thus the circumferential first end portion side of the magnetic pole portion 20 and the circumferential second end portion side of the magnetic pole portion 20 adjacent to the circumferential first end portion side are cooled, and similarly, the circumferential second end portion side of the magnetic pole portion 20 and the circumferential first end portion side of the magnetic pole portion 20 adjacent to the circumferential second end portion side are cooled. As a result, the structure of rotor core 1 can be simplified.

[Shape of Refrigerant Flow Passage Hole]

As illustrated in FIG. 2, the refrigerant flow passage hole 30 has a substantially square shape which is convex on both sides in the circumferential direction and on both sides in the radial direction. The refrigerant flow passage hole 30 has a first end portion 30a and a second end portion 30b which form both circumferential end portions, an outer radial side apex portion 30c which is disposed on the virtual line L2, has a longer radial distance from the center CL of the rotor core 1 than the first end portion 30a and the second end portion 30b, and forms a radially outer apex portion, and an inner radial side apex portion 30d which is disposed on the imaginary line L2, has a shorter radial distance from the center CL of the rotor core 1 than the first end 30a and the second end 30b, and forms a radially inner apex portion.

Furthermore, the refrigerant flow passage hole 30 includes an outer peripheral wall 30e having a first outer peripheral wall 30f extending substantially linearly from the first end portion 30a to the outer radial side apex portion 30c and a second outer peripheral wall 30g extending substantially linearly from the second end portion 30b to the outer radial side apex portion 30c. In addition, the refrigerant flow passage hole 30 includes an inner peripheral wall 30h having a first inner peripheral wall 30i extending substantially linearly from the first end portion 30a to the inner radial side apex portion 30d and a second inner peripheral wall 30j extending substantially linearly from the second end portion 30b to the inner radial side apex portion 30d.

The outer radial side apex portion 30c of the refrigerant flow passage hole 30 is located radially outward of the innermost diameter portion of the magnetic pole portion 20. As a result, since the refrigerant flow path can be formed in a vicinity of the circumferential end portion of the magnetic pole portion 20, the cooling performance of the rotor 100 is improved.

In the outer peripheral wall 30e of the refrigerant flow passage hole 30 located on the circumferential first end portion side of the magnetic pole portion 20, the second outer peripheral wall 30g is substantially parallel to the radially inner end surface 3a of the magnet 3 disposed on the circumferential first end portion side of the magnetic pole portion 20 and the first outer peripheral wall 30f is substantially parallel to the radially inner end surface 3a of the magnet 3 disposed on the circumferential second end portion side of the magnetic pole portion 20 adjacent to the circumferential first end portion side. Similarly, in the outer peripheral wall 30e of the refrigerant flow passage hole 30 located on the circumferential second end portion side of the magnetic pole portion 20, the first outer peripheral wall 30f is substantially parallel to the radially inner end surface 3a of the magnet 3 disposed on the circumferential second end portion side of the magnetic pole portion 20 and the second outer peripheral wall 30g is substantially parallel to the radially inner end surface 3a of the magnet 3 disposed on the circumferential first end portion side of the magnetic pole portion 20 adjacent to the circumferential second end portion side.

Thus, the refrigerant flow passage hole 30 can be formed in the vicinity of the circumferential end portion of the magnetic pole portion 20 while securing the q-axis magnetic path, so that the cooling performance of the rotor 100 is improved without the q-axis inductance decreasing.

In the inner peripheral wall 30h of the refrigerant flow passage hole 30, the first inner peripheral wall 30i is substantially parallel to the second outer peripheral wall 8g of the hole portion 8 of the second hole portion group 9 adjacent to the circumferential first end portion side of a rib 17 described below and the second inner peripheral wall 30j is substantially parallel to the first outer peripheral wall 8f of the hole portion 8 of the second hole portion group 9 adjacent to the circumferential second end portion side of the rib 17 described below.

The inner radial side apex portion 30d of the refrigerant flow passage hole 30 is arranged on the virtual line L2, so the refrigerant flow passage hole 30 deforms so that the inner radial side apex portion 30d is pushed radially outward with respect to the tightening load of the rotor shaft 2. By the deformation of the refrigerant flow passage hole 30, the tightening load of the rotor shaft 2 is absorbed by the refrigerant flow passage hole 30. As a result, it is possible to arrange the refrigerant flow passage hole 30 further on the outer peripheral side of the rotor core 1 while suppressing the deformation of the outer peripheral portion of the rotor core due to the tightening load of the rotor shaft 2, and thus the cooling performance of the rotor 100 is improved.

Next, the first hole portion group 6 and the second hole portion group 9, which are disposed radially inward of the cooling portion 33, and the annular portion 10 formed by those hole portion groups 6 and 9 will be described. The annular portion 10 functions as a region for absorbing the centrifugal force due to the rotation of the rotor and the tightening load of the rotor shaft 2.

[Arrangement of Hole Portions]

Respective hole portions 5 of the first hole portion group 6 are disposed at a position intersecting the virtual line L1 and a position intersecting the virtual line L2. A rib 16 is formed between the adjacent hole portions 5 of the first hole portion group 6. Each hole portion 8 of the second hole portion group 9 is arranged to intersect with a virtual line L16, which is a virtual extension line of the rib 16 passing through the center CL of the rotor core 1 and a circumferential center position of the rib 16. That is, the hole portions 5 of the first hole portion group 6 and the hole portions 8 of the second hole portion group 9 are alternately arranged in the circumferential direction. Thereby, the centrifugal force can be absorbed by the hole portion 8 of the second hole portion group 9 and the transfer of the centrifugal force to the rib 16 can be suppressed.

Each hole portion 8 of the second hole portion group 9 of the embodiment is disposed so that the circumferential center position is on the virtual line L16. Furthermore, each hole portion 8 of the second hole portion group 9 has a circumferential length longer than that of the rib 16 and circumferentially overlaps both adjacent hole portions 5 with the rib 16 interposed therebetween.

The rib 17 is formed between the adjacent hole portions 8 of the second hole portion group 9. The rib 17 is disposed so that the circumferential center position is on the virtual line L1 or the virtual line L2.

A plurality of hole portions 5 of the first hole portion group 6 and a plurality of hole portions 8 of the second hole portion group 9 are arranged at equal intervals in the circumferential direction. Therefore, each of the hole portion groups 6 and 9 can receive the centrifugal force equally over the entire circumferential direction.

[Shape of Hole Portion]

Figure 3A:
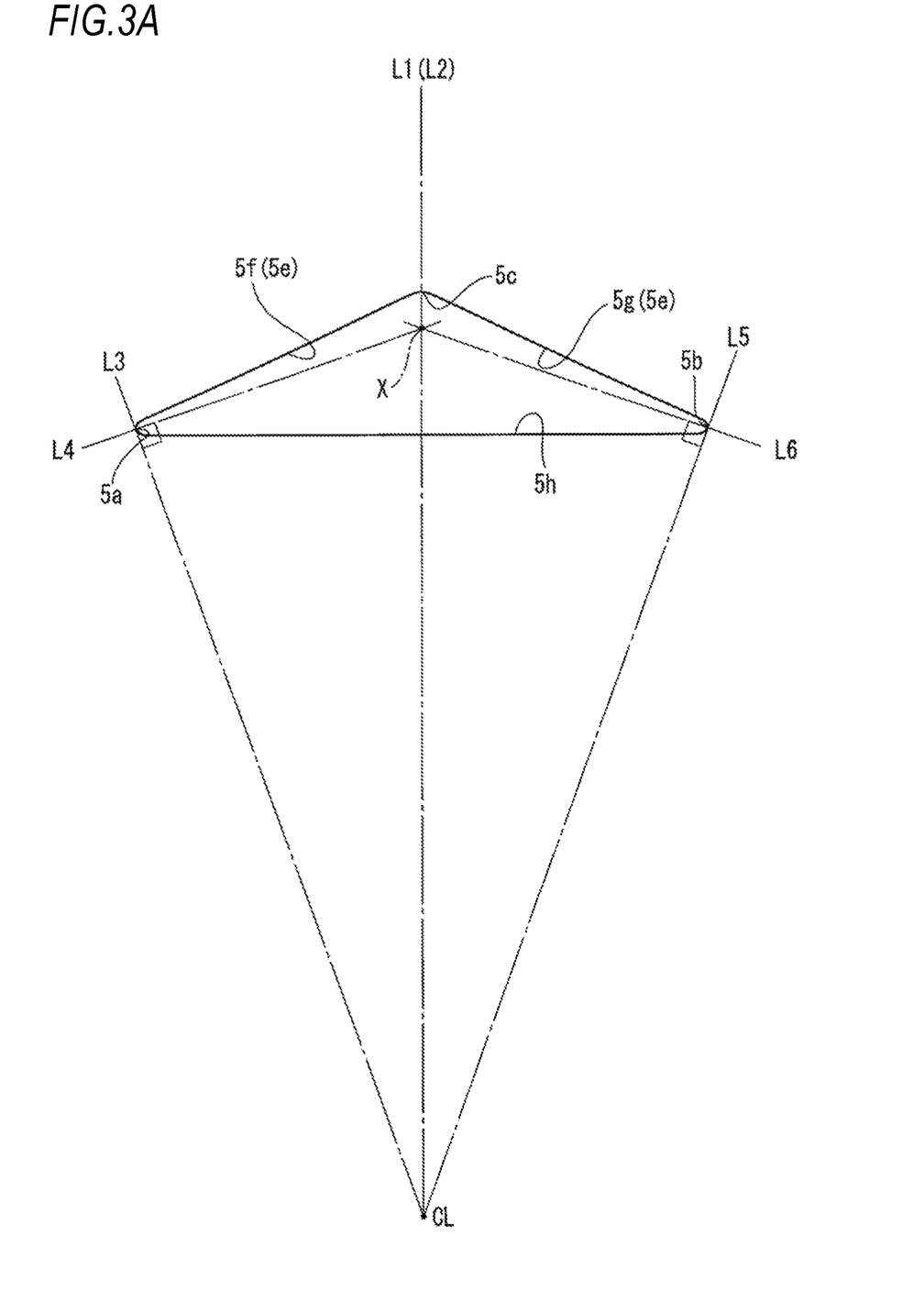
FIG. 3A is an enlarged view of a hole portion of a first hole portion group.

As illustrated in FIG. 3A, each hole portion 5 of the first hole portion group 6 has a substantially triangular shape convex outward in the radial direction. The hole portion 5 of the first hole portion group 6 has a first end portion 5a and a second end portion 5b which form both circumferential end portions and an outer radial side apex portion 5c which has a radial distance from the center CL of the rotor core 1 is longer than that of the first end portion 5a and the second end portion 5b and forms an apex portion on the radial outer side. The outer radial side apex portion 5c is located on the virtual line L1 or virtual line L2. Furthermore, the hole portion 5 of the first hole portion group 6 includes an outer peripheral wall 5e which has a first outer peripheral wall 5f extending substantially linearly from the first end portion 5a to the outer radial side apex portion 5c and a second outer peripheral wall 5g extending substantially linearly from the second end portion 5b to the outer radial side apex portion 5c. Further, the hole portion 5 of the first hole portion group 6 includes an inner peripheral wall 5h which is substantially orthogonal to the virtual line L1 or the virtual line L2 and extends substantially linearly from the first end portion 5a to the second end portion 5b.

Each hole portion 5 of the first hole portion group 6 is deformed so that the outer radial side apex portion 5c is pulled radially outward with respect to the centrifugal force. The centrifugal force is absorbed by the hole portion 5 due to the deformation of the hole portion 5. Therefore, since it is possible to suppress the centrifugal force from being transmitted to the radial inner side of the rotor core 1, it is possible to suppress the widening of the rotor shaft hole 4 due to the centrifugal force and the reduction of the interference due to this.

Furthermore, since, in the hole portion 5 of the first hole portion group 6, the inner peripheral wall 5h has a substantially straight line shape substantially orthogonal to the virtual line L1 or the virtual line L2, a force acting on the inner peripheral wall 5h when the centrifugal force acts on the outer radial side apex portion 5c of the hole portion 5 has substantially no radial component at the circumferentially central portion of the inner peripheral wall 5h. Therefore, since deformation of the shaft holding portion 7 can be reduced, it is possible to suppress the widening of the rotor shaft hole 4 due to the centrifugal force and the reduction of the interference due to this.

The hole portion 5 of the first hole portion group 6 has an outer radial side apex portion 5c located on the virtual line L2 and has a symmetrical shape with respect to the virtual line L2.

The outer radial side apex portion 5c of the hole portion 5 of the first hole portion group 6 is located at an intersection point X between a virtual line L4 which is orthogonal to a virtual line L3 connecting the center CL of the rotor core 1 and the first end portion 5a and passes through the first end portion 5a and a virtual line L6 which is orthogonal to a virtual line L5 connecting the center CL of the rotor core 1 and the second end portion 5b and passes through the second end portion 5b or is located radially outward of the intersection point X. In the embodiment, the outer radial side apex portion 5c of the hole portion 5 of the first hole portion group 6 is located radially outward of the intersection point X.

Figure 3B:
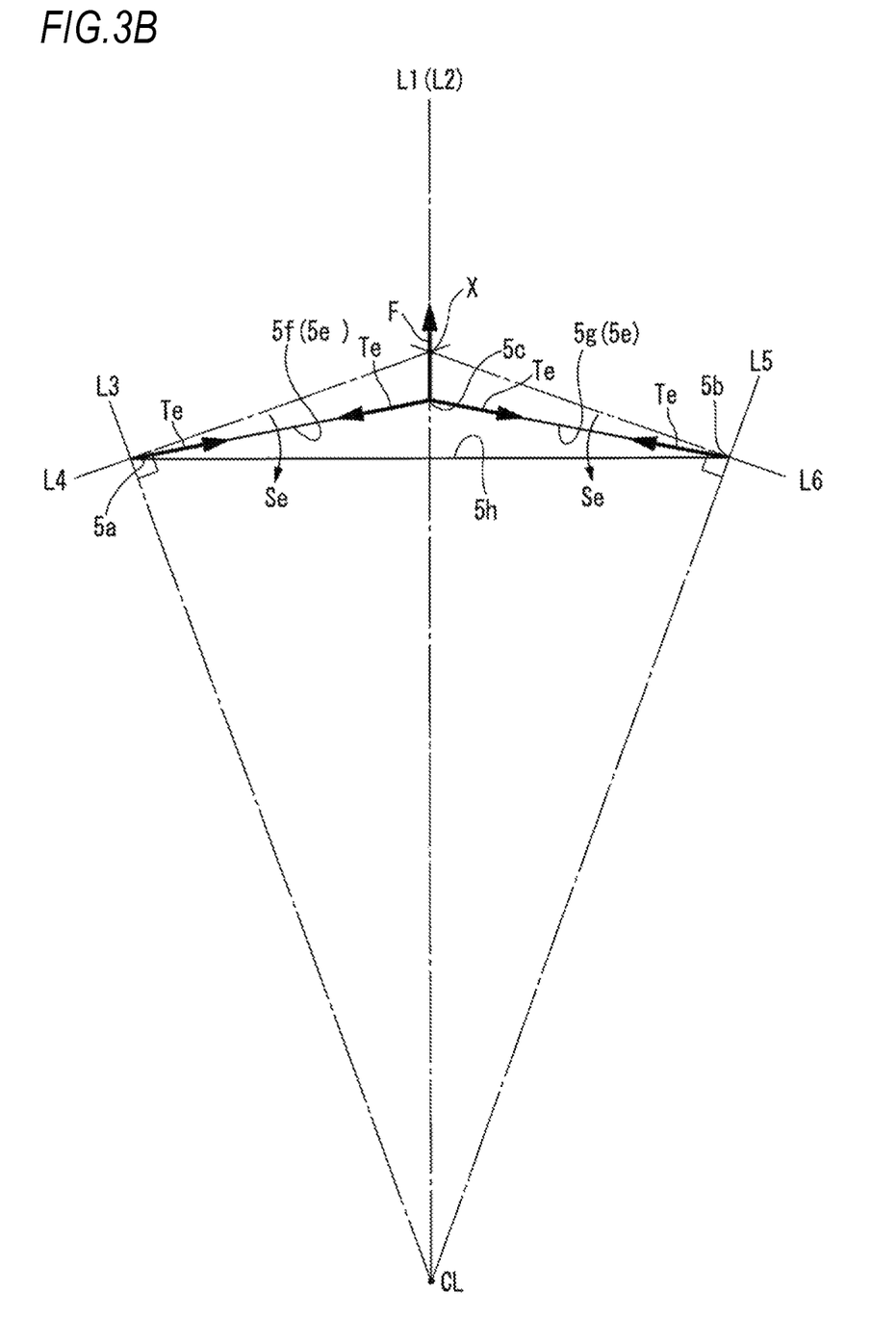
FIG. 3B is a view illustrating a force acting when an outer radial side apex portion of the first hole portion group is located inside an intersection point X.

As illustrated in FIG. 3B, when the outer radial side apex portion 5c is positioned radially inward of the intersection point X and a centrifugal force F acts on the outer radial side apex portion 5c, a bending stress Se in the radially inward direction is generated in the outer peripheral wall 5e in addition to a tension Te. Therefore, in a region around the first end portion 5a and the second end portion 5b of the outer peripheral wall 5e, the bending moment becomes large and the bending stress is concentrated.

Figure 3C:
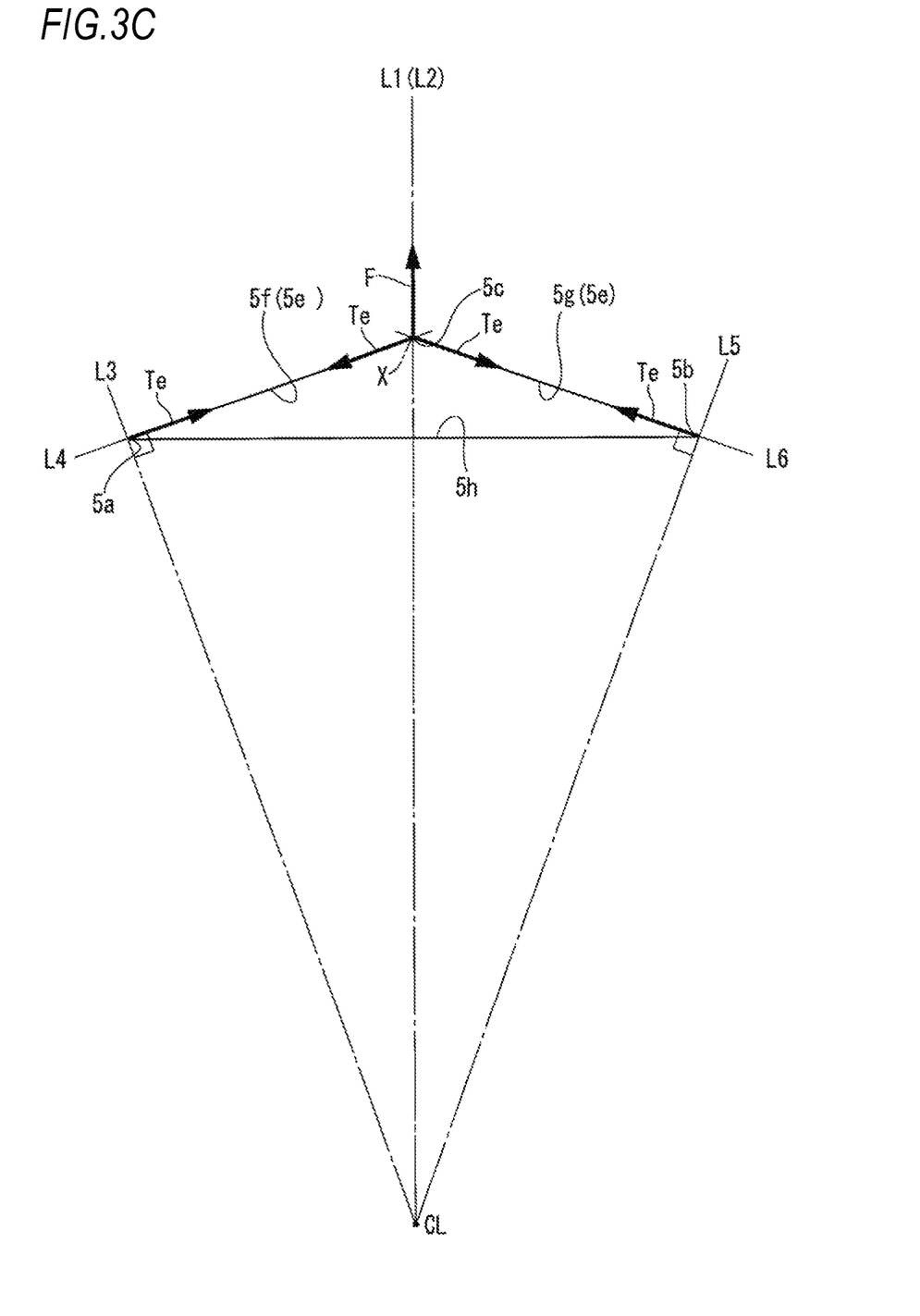
FIG. 3C is a view illustrating a force acting when the outer radial side apex portion of the first hole portion group is located at the intersection point X.

On the other hand, as illustrated in FIG. 3C, since, when the outer radial side apex portion 5c is located at the intersection point X, the first outer peripheral wall 5f is along the virtual line L4 and the second outer peripheral wall 5g is along the virtual line L6, even when the centrifugal force F acts on the outer radial side apex portion 5c, almost no bending stress occurs in the outer peripheral wall 5e. Therefore, stress concentration in a region around the first end portion 5a and the second end portion 5b of the outer peripheral wall 5e can be alleviated.

Figure 3D:
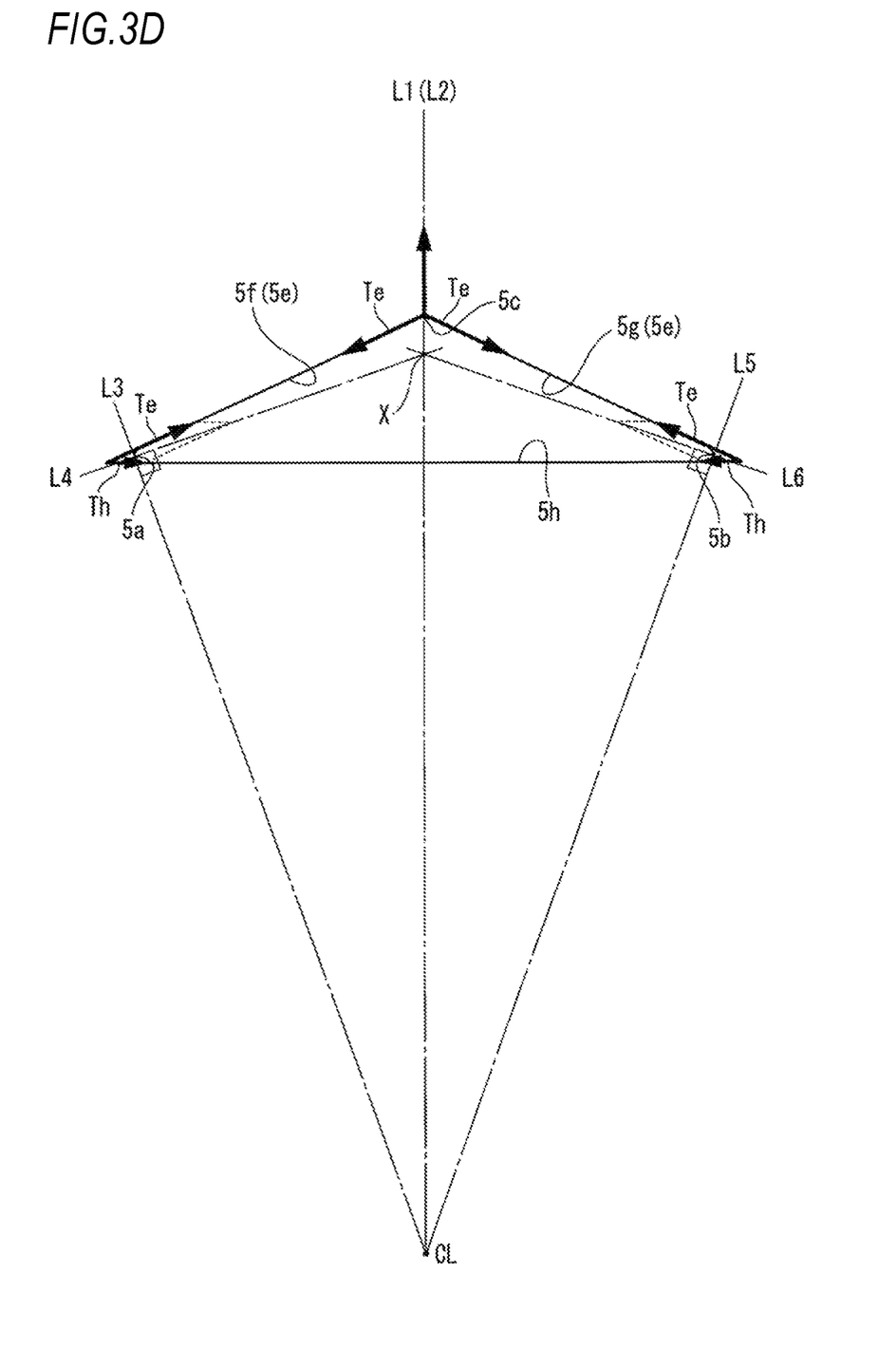
FIG. 3D is a view illustrating a force acting when the outer radial side apex portion of the first hole portion group is located outside the intersection point X.

Also, as illustrated in FIG. 3D, when the outer radial side apex portion 5c is positioned radially outward of the intersection point X, gaps are formed in a portion between the outer peripheral wall 5e and the virtual line L4 from the first end portion 5a to the intersection point X and a portion between the outer peripheral wall 5e and the virtual line L6 from the second end portion 5b to the intersection point X. Therefore, when the centrifugal force F acts on the outer radial side apex portion 5c, in addition to the tension being generated in the outer peripheral wall 5e, the tension Th is generated in the inner peripheral wall 5h. Thus, the stress generated in the hole portion 5 by the centrifugal force F acting on the outer radial side apex portion 5c is dispersed to the outer peripheral wall 5e and the inner peripheral wall 5h. As a result, the bending stress generated in the outer peripheral wall 5e can be reduced and the stress concentration in the region around the first end portion 5a and the second end portion 5b of the outer peripheral wall 5e can be alleviated.

As described above, the outer radial side apex portion 5c of the hole portion 5 of the first hole portion group 6 is located at the intersection point X between the virtual line L4 and the virtual line L6 or located radially outward of the intersection point X. Thus, since it is possible to reduce the bending stress generated in the first outer peripheral wall 5f and the second outer peripheral wall 5g when a centrifugal force is generated, stress concentration in the region around the first end portion 5a and the second end portion 5b of the outer peripheral wall 5e by the centrifugal force can be alleviated.

Since, in the hole portion 5 of the first hole portion group 6, the inner peripheral wall 5h has a substantially linear shape, a force acting on the inner peripheral wall 5h when the centrifugal force acts on the outer radial side apex portion 5c of the hole portion 5 has almost no radial component in the circumferential central portion of the inner peripheral wall 5h. Therefore, it is possible to suppress the widening of the rotor shaft hole 4 due to the centrifugal force and the reduction of the interference due to this.

Figure 4A:
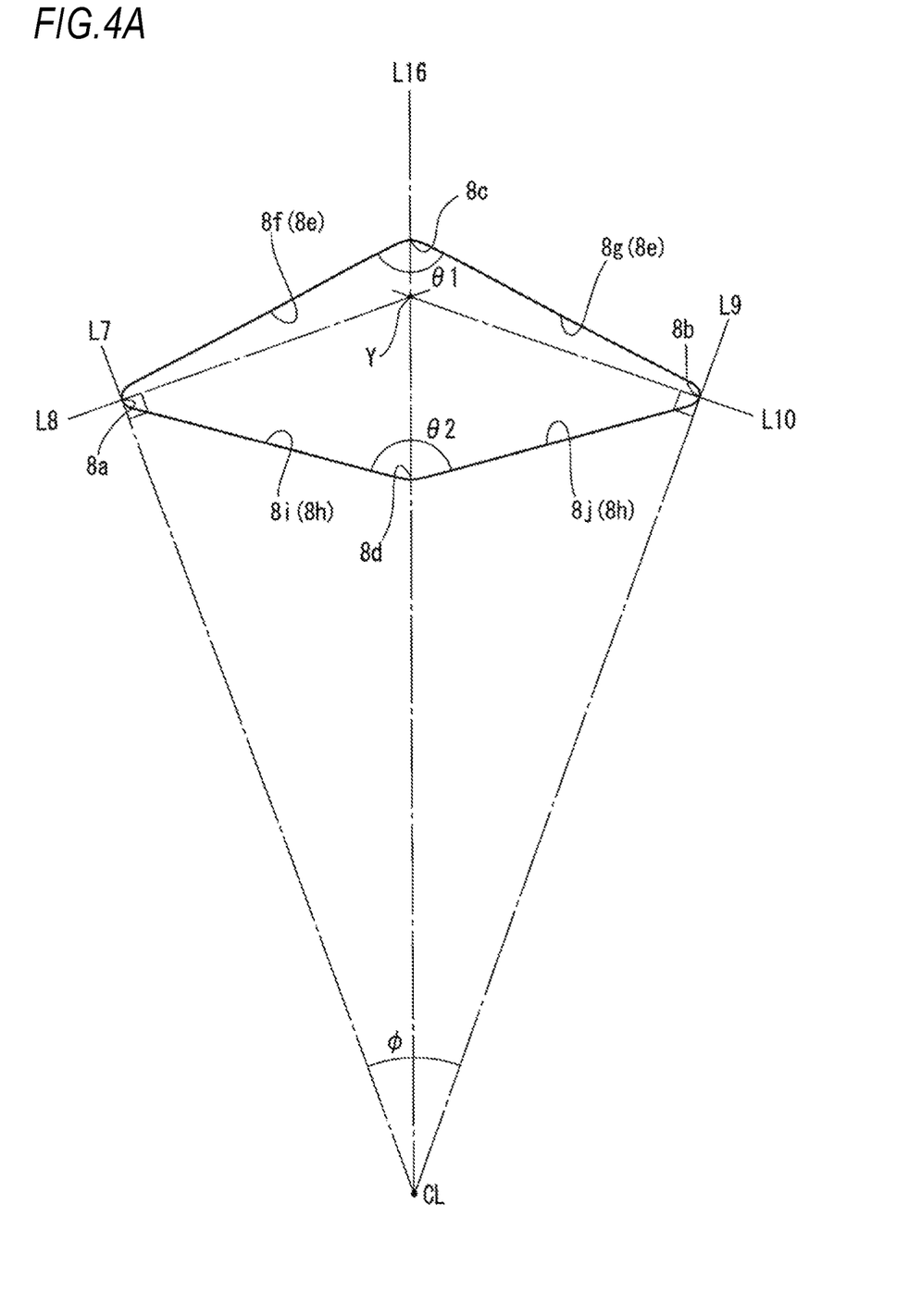
FIG. 4A is an enlarged view of a hole portion of a second hole portion group.

As illustrated in FIG. 4A, each hole portion 8 of the second hole portion group 9 has a substantially rectangular shape convex on both sides in the circumferential direction and both sides in the radial direction. Each hole portion 8 of the second hole portion group 9 has a first end portion 8a and a second end portion 8b forming both circumferential end portions, an outer radial side apex portion 8c which has a radial distance from the center CL of the rotor core 1 longer than that of the first end portion 8a and the second end portion 8b and forms a radially outer apex portion, and an inner radial side apex portion 8d which has a radial distance from the center CL of the rotor core 1 shorter than that of the first end portion 8a and the second end portion 8b and forms a radially inner apex portion. Therefore, the hole area of the hole portion 8 can be increased, and thus the weight reduction of the rotor core 1 can be achieved. In addition, stress concentration in the first end portion 8a and the second end portion 8b due to the centrifugal force and the tightening load of the rotor shaft 2 can be alleviated.

Further, the hole portion 8 of the second hole portion group 9 includes an outer peripheral wall 8e which has a first outer peripheral wall 8f extending substantially linearly from the first end portion 8a to the outer radial side apex portion 8c and a second outer peripheral wall 8g extending substantially linearly from the second end portion 8b to the outer radial side apex portion 8c. In addition, the hole portion 8 of the second hole portion group 9 includes an inner peripheral wall 8h which has a first inner peripheral wall 8i extending substantially linearly from the first end portion 8a to the inner radial side apex portion 8d and a second inner peripheral wall 8j extending substantially linearly from the second end portion 8b to the inner radial side apex portion 8d.

Each hole portion 8 of the second hole portion group 9 is deformed so that the outer radial side apex portion 8c is pulled radially outward with respect to the centrifugal force. By the deformation of the hole portion 8, the centrifugal force is absorbed in the hole portion 8. Therefore, since it is possible to suppress the centrifugal force from being transmitted to the radially inner side of the rotor core 1, it is possible to suppress the widening of the rotor shaft hole 4 due to the centrifugal force and the reduction of the interference due to this.

Furthermore, the hole portion 8 of the second hole portion group 9 is deformed so that the inner radial side apex portion 8d is pushed radially outward with respect to the tightening load of the rotor shaft 2. By the deformation of the hole portion 8, the tightening load of the rotor shaft 2 is absorbed in the hole portion 8. Therefore, since it is possible to suppress the tightening load of the rotor shaft 2 from being transmitted to the outside in the radial direction of the rotor core 1, it is possible to suppress the deformation of the outer peripheral portion of the rotor core 1 due to the tightening load of the rotor shaft 2.

In the hole portion 8 of the second hole portion group 9, the outer radial side apex portion 8c and the inner radial side apex portion 8d are located on the virtual line L16 and has a symmetrical shape with respect to the virtual line L16.

The outer radial side apex portion 8c of the hole portion 8 of the second hole portion group 9 is located at an intersection point Y between a virtual line L8 which is orthogonal to a virtual line L7 connecting the center CL of the rotor core 1 and the first end portion 8a and passes through the first end portion 8a and a virtual line L10 which is orthogonal to a virtual line L9 connecting the center CL of the rotor core 1 and the second end portion 8b and passes through the second end portion 8b or is located radially outward of the intersection point Y. In the embodiment, the outer radial side apex portion 8c of the hole portion 8 of the second hole portion group 9 is located radially outward of the intersection point Y.

Therefore, since the hole portion 8 of the second hole portion group 9 can reduce the bending stress generated in the first outer peripheral wall 8f and the second outer peripheral wall 8g when the centrifugal force is generated, it is possible to alleviate the stress concentration in a region around the first end portion 8a and the second end portion 8b of the outer peripheral wall 8e due to the centrifugal force.

Returning to FIG. 2, the inner peripheral wall 8h of the hole portion 8 of the second hole portion group 9 is parallel to the outer peripheral wall 5e of the opposing hole portion 5 across the annular portion 10. More specifically, the first inner peripheral wall 8i of the hole portion 8 of the second hole portion group 9 is substantially parallel to the second outer peripheral wall 5g of the opposing hole portion 5 across the annular portion 10. Similarly, the second inner peripheral wall 8j of the hole portion 8 of the second hole portion group 9 is substantially parallel to the first outer peripheral wall 5f of the opposing hole portion 5 across the annular portion 10.

Furthermore, a distance between the first end portion 5a of the hole portion 5 and the second end portion 5b of the hole portion 5 circumferentially adjacent to the first end portion 5a is a width W16 of the rib 16. Similarly, a distance between the first end portion 8a of the hole portion 8 and the second end portion 8b of the hole portion 8 circumferentially adjacent to the first end portion 8a is a width W17 of the rib 17.

The width W17 of the rib 17 is larger than the width W16 of the rib 16. That is, the width of the rib located on the radially outer side of the rotor core 1 is larger.

Therefore, since the width of the rib located on the radially outer side of the rotor core 1 is larger, the rotor core 1 has a higher rigidity toward the radially outer side and is less likely to be deformed. Therefore, it can suppress the outer peripheral portion of rotor core 1 from being deformed by the centrifugal force. In addition, since the rib located on the radially outer side of the rotor core 1 has a larger width, stress concentration on the rib due to the centrifugal force can be alleviated.

Returning to FIG. 4A, an angle $\theta 1$ formed by the first outer peripheral wall 8f and the second outer peripheral wall 8g of the hole portion 8 of the second hole portion group 9 and an angle $\theta 2$ formed by the first inner peripheral wall 8i and the second inner peripheral wall 8j of the hole portion 8 of the second hole portion group 9 satisfy the following equation (1), taking an angle formed by the first end portion 8a and the second end portion 8b at the center CL of the rotor core 1 as $\phi$. Each of $\theta 1$ and $\theta 2$ is an angle larger than 0° and smaller than 180°. $\phi$ is an angle larger than 0° and smaller than 360°/(the number of magnet pole portions 20 of rotor core 1). In the embodiment, since the number of magnet pole portions 20 of the rotor core 1 is 12, $\phi$ is an angle larger than 0° and smaller than 30°.

$$\theta 1 + 2\phi \geq \theta 2 \geq \theta 1 \qquad (1)$$

Figure 4B:
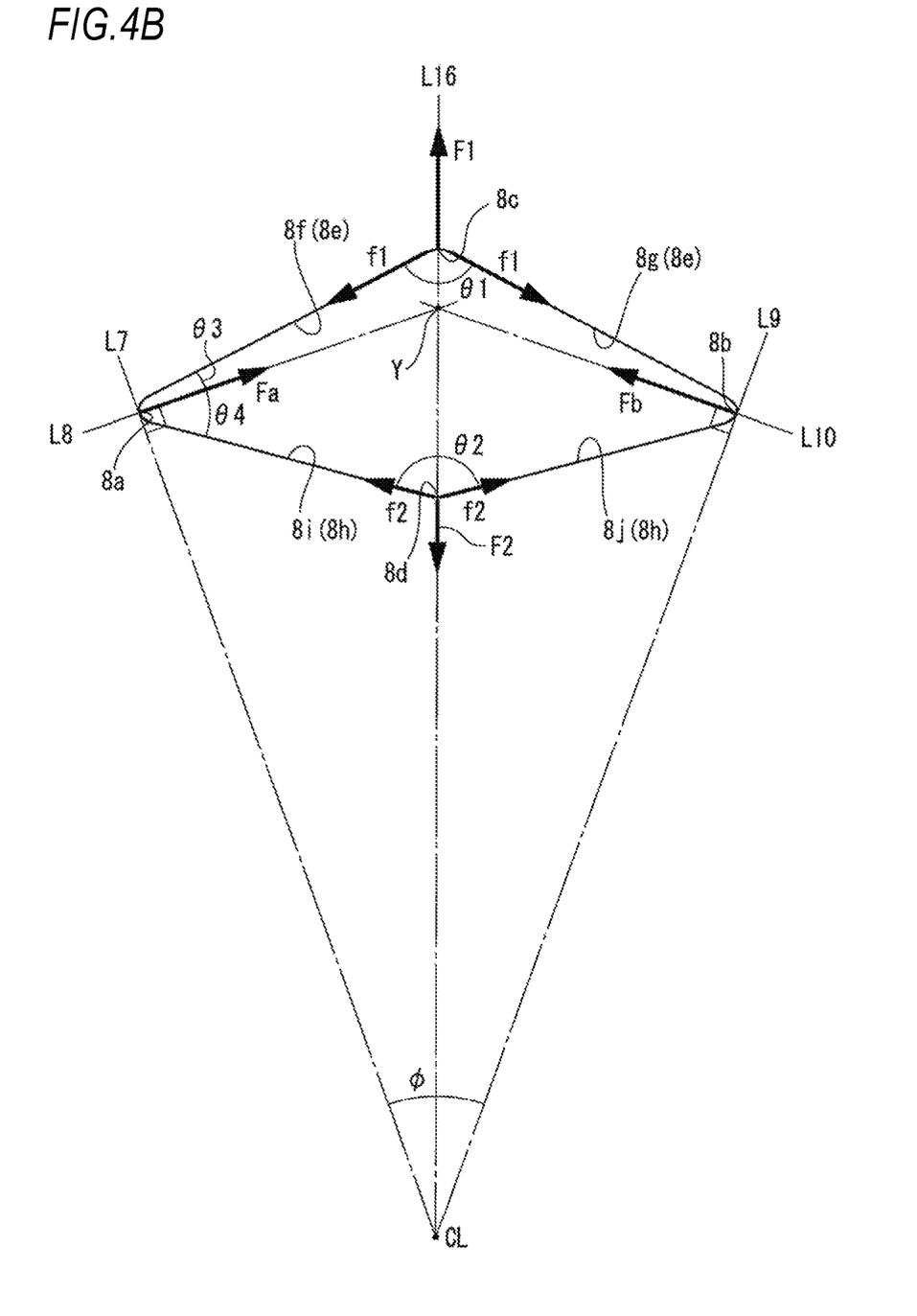
FIG. 4B is a view illustrating a force acting on the hole portion of the second hole portion group.

As illustrated in FIG. 4B, when a centrifugal force F1 acts on the outer radial side apex portion 8c of the hole portion 8, a force Fa acting in a direction toward the intersection point Y along the virtual line L8 is generated in the first end portion 8a and a force Fb acting in a direction toward the intersection point Y along the virtual line L10 is generated in the second end portion 8b, and further, a force F2 acting radially inward along the virtual line L1 is generated in the inner radial side apex portion 8d.

Since the hole portion 8 of the second hole portion group 9 has a symmetrical shape with respect to the virtual line L16, assuming that the tension generated in the first outer peripheral wall 8f by the centrifugal force F1 is f1, the following equation (2) is established.

$$F1 = 2*f1*\cos(\theta 1/2) \qquad (2)$$

Similarly, assuming that the tension generated in the first inner peripheral wall 8i by the force F2 is f2, the following equation (3) is established.

$$F2 = 2*f2*\cos(\theta 2/2) \qquad 3)$$

Assuming that an angle formed by the first outer peripheral wall 8f and the virtual line L8 at the first end portion 8a of the hole portion 8 of the second hole portion group 9 is $\theta 3$ and an angle formed by the first inner peripheral wall 8i and the virtual line L8 at the first end portion 8a is $\theta 4$, the following equation (4) is established.

$$Fa = f1*\cos\theta 3 + f2*\cos\theta 4 \qquad (4)$$

Further, since the force Fa acting on the first end portion 8a acts only in a direction toward the intersection point Y along the virtual line L8, the components orthogonal to the virtual line L8 cancel each other and the following equation (5) is established.

$$f1*\sin\theta 3 = f2*\sin 4 \qquad 5)$$

Further, since the hole portion 8 of the second hole portion group 9 has a symmetrical shape with respect to the virtual line L16, the following equations (6) and (7) are established.

$$\theta 3 = 90° - (\theta 1 + \phi)/2 \qquad (6)$$

$$\theta 4 = 90° - (\theta 2 - \phi)/2 \qquad (7)$$

From the equations (2) to (7), the following equation (8) is derived by eliminating f1, f2, $\theta 3$, $\theta 4$, and Fa.

$$F2 = F1 \cdot \frac{\cos\frac{\theta 1 + \phi}{2}}{\cos\frac{\theta 2 - \phi}{2}} \cdot \frac{\cos\frac{\theta 2}{2}}{\cos\frac{\theta 1}{2}} \qquad (8)$$

Here, since $\theta 1$, $\theta 2$, and $\phi$ satisfy the equation (1), the following equations (9) and (10) are established.

$$\theta 1 + \phi \geq v2 - \phi \qquad (9)$$

$$\theta 2 \geq \theta 1 \qquad (10)$$

Therefore, the following equations (11) and (12) are established.

$$\frac{\cos\frac{\theta 1 + \phi}{2}}{\cos\frac{\theta 2 - \phi}{2}} \leq 1 \qquad (11)$$

$$\frac{\cos\frac{\theta 2}{2}}{\cos\frac{\theta 1}{2}} \leq 1 \qquad (12)$$

Therefore, from the equations (8), (11), and (12), the centrifugal force F1 acting on the outer radial side apex portion 8c of the hole portion 8 and the force F2 acting on the inner radial side apex portion 8d by the centrifugal force F1 always satisfy F2≤F1.

That is, in the hole portion 8 of the second hole portion group 9, the force F2 acting on the inner radial side apex portion 8d by the centrifugal force F1 is always smaller than the centrifugal force F1 acting on the outer radial side apex portion 8c. As a result, since the reaction force of the force F2 acting on the inner radial side apex portion 8d is always smaller than the centrifugal force F1, it is possible to suppress the widening of the rotor shaft hole 4 due to the centrifugal force and the reduction of the interference due to this.

In the hole portion 8 of the second hole portion group 9, the outer radial side apex portion 8c and the inner radial side apex portion 8d are located on the virtual line L16 and the hole portion 8 has a symmetrical shape with respect to the virtual line L16. Therefore, the hole portion 8 can further suppress the widening of the rotor shaft 4 due to the centrifugal force and the reduction of the interference due to this, and it is possible to more effectively absorb the tightening load of the rotor shaft 2.

Also, the plurality of hole portions 5 of the first hole portion group 6 are all the same shape and the plurality of hole portions 8 of the second hole portion group 9 are all the same shape. Furthermore, the outer radial side apex portions 5c of the plurality of hole portions 5 of the first hole portion group 6 are arranged such that all radial distances from the center CL of the rotor core 1 are equal. The outer radial side apex portions 8c of the plurality of hole portions 8 of the second hole portion group 9 are arranged such that all radial distances from the center CL of the rotor core 1 are equal and the inner radial side apex portions 8d of the plurality of hole portions 8 of the second hole portion group 9 are arranged such that all radial distances from the center CL of the rotor core 1 are equal.

In this way, the first hole portion group 6 and the second hole portion group 9 can receive the centrifugal force in a well-balanced manner and it is possible to equalize the deformation in the plurality of hole portions 5 of the first hole portion group 6 and the deformation in the plurality of hole portions 8 of the second hole portion group 9.

The first end portion 8a, the second end portion 8b, the outer radial side apex portion 8c, and the inner radial side apex portion 8d of the hole portion 8 of the embodiment all have rounded corners in which the corners are rounded. However, the shapes of first end portion 8a, the second end portion 8b, the outer radial side apex portion 8c, and the inner radial side apex portion 8d can be changed as appropriate.

The hole portion 5 of the portion group 6 has a substantially triangular shape convex radially outward and the hole portion 8 of the second hole portion group 9 has a substantially rectangular shape convex on both sides in the circumferential direction and both sides in the radial direction. However, the shapes of the hole portions 5 and 8 can be changed as appropriate.

In the embodiment described above, modifications, improvements, and the like can be made as appropriate.

At least the following matters are described in the present specification. In addition, although the constituent components corresponding in the embodiment described above are described, it is not limited to this.

(1) A rotor (rotor 100) which includes a rotor core (rotor core 1) having a rotor shaft hole (rotor shaft hole 4) into which a rotor shaft (rotor shaft 2) is tightened and a plurality of magnet insertion holes (magnet insertion holes 14) provided along a circumferential direction and a plurality of magnetic pole portions (magnetic pole portions 20) constituted by magnets (magnets 3) inserted into the magnet insertion holes, where the rotor core includes a cooling portion (cooling portion 33) having a plurality of refrigerant flow passage holes (refrigerant flow passage holes 30) provided radially inward of the plurality of magnetic pole portions and arranged along a circumferential direction, the plurality of refrigerant flow passage holes are arranged on both circumferential end portion sides of each magnetic pole portion, the refrigerant flow passage hole includes an inner radial side apex portion (inner radial side apex portion 30d) protruding radially inward, and an outer peripheral wall (outer peripheral wall 30e) of the refrigerant flow passage hole includes an outer radial side apex portion (outer radial side apex portion 30c) protruding radially outward.

According to (1), since the refrigerant flow passage hole includes the inner radial side apex portion protruding radially inward, the inner radial side apex portion is deformed so as to be pushed radially outward with respect to the tightening load of the rotor shaft. As a result, since it is possible to absorb the tightening load of the rotor shaft and to suppress the deformation of the outer peripheral portion of the rotor core, it becomes possible to arrange the refrigerant flow passage hole further on the outer peripheral side of the rotor core, and thus the cooling performance of the rotor is improved. Also, since the outer peripheral wall of the refrigerant flow passage hole includes the outer radial side apex portion protruding radially outward, the refrigerant flow path can be formed further on the outer peripheral side of the rotor core, and thus the cooling performance of the rotor is improved.

(2) The rotor according to (1), where
at least a part of the outer peripheral wall of the refrigerant flow passage hole is parallel to a radially inner end surface (radially inner end surface 3a) of the magnet.

According to (2), at least a part of the outer peripheral wall of the refrigerant flow passage hole is parallel to the radially inner end surface of the magnet, so that the refrigerant flow passage hole can be formed in the vicinity of the circumferential end portion of the magnetic pole portion while securing the q-axis magnetic path. This makes it possible to improve the cooling performance of the rotor without reducing the q-axis inductance.

(3) The rotor according to (1) or (2), where
the refrigerant flow passage hole located on a circumferential first end portion side of the magnetic pole portion is in common with the refrigerant flow passage hole located on a circumferential second end portion side of a magnetic pole portion adjacent to the circumferential first end portion side, and
the refrigerant flow passage hole located on the circumferential second end portion side of the magnetic pole portion is in common with the refrigerant flow passage hole located on the circumferential first end portion side of a magnetic pole portion adjacent to the circumferential second end portion side.

According to (3), one refrigerant flow path can cool the circumferential first end portion side of the magnetic pole portion and the circumferential second end portion side of the magnetic pole portion adjacent to the circumferential first end portion side, and similarly, one refrigerant flow path can cool the circumferential second end portion side of the magnetic pole portion and the circumferential first end portion side of the magnetic pole portion adjacent to the circumferential second end portion side. As a result, the structure of rotor core can be simplified.

(4) The rotor according to any one of (1) to (3), where
the magnetic pole portion has a shape in which a circumferential center is located further on a radially inner side of the rotor core than both circumferential end portion sides, and
the outer radial side apex portion of the refrigerant flow passage hole is located further on a radially outer side than an innermost diameter portion of the magnetic pole portion.

According to (4), the outer radial side apex portion of the refrigerant flow passage hole is located further on the radially outer side than the innermost diameter portion of the magnetic pole portion. As a result, since the refrigerant flow path can be formed in the vicinity the circumferential end portion of the magnetic pole portion, the cooling performance of the rotor is improved.

The invention claimed is:

1. A rotor comprising:
a rotor core having a rotor shaft hole into which a rotor shaft is tightened and a plurality of magnet insertion holes provided along a circumferential direction; and
a plurality of magnetic pole portions constituted by magnets inserted into the magnet insertion holes, wherein:
the rotor core includes: a first hole portion group having a plurality of first hole portions arranged circumferentially and disposed radially outward of the rotor shaft hole; a second hole portion group having a plurality of second hole portions arranged circumferentially and disposed radially outward of the first hole portion group; and a cooling portion having a plurality of refrigerant flow passage holes, provided radially inward of the plurality of magnetic pole portions and radially outward of the second hole portion group, and arranged along a circumferential direction;
the plurality of refrigerant flow passage holes are arranged on both circumferential end portion sides of each magnetic pole portion;
the refrigerant flow passage hole includes an inner radial side apex portion protruding radially inward;
an outer peripheral wall of the refrigerant flow passage hole includes an outer radial side apex portion protruding radially outward;
the first hole portions are located on a first virtual line which coincides with a d-axis being the center axis of the magnetic pole portion and a second virtual line which coincides with a q-axis being 90 degrees apart from the d-axis by an electrical angle;
a first rib is formed between adjacent first hole portions of the first hole portion group;
each second hole portion of the second hole portion group is arranged to intersect with a third virtual line, which is a virtual extension line of the first rib passing through the center of the rotor core and a circumferential center position of the first rib;
a second rib is formed between adjacent hole portions of the second hole portion group, the second rib being disposed so that a circumferential center position of the second rib is on the first virtual line or the second virtual line; and
the plurality of refrigerant flow passage holes are arranged on the second virtual line.

2. The rotor according to claim 1, wherein
at least a part of the outer peripheral wall of the refrigerant flow passage hole is parallel to a radially inner end surface of the magnet.

3. The rotor according to claim 1, wherein:
the refrigerant flow passage hole located on a circumferential first end portion side of the magnetic pole portion is in common with the refrigerant flow passage hole located on a circumferential second end portion side of a magnetic pole portion adjacent to the circumferential first end portion side; and
the refrigerant flow passage hole located on the circumferential second end portion side of the magnetic pole portion is in common with the refrigerant flow passage hole located on the circumferential first end portion side of a magnetic pole portion adjacent to the circumferential second end portion side.

4. The rotor according to claim 1, wherein:
the magnetic pole portion has a shape in which a circumferential center is located further on a radially inner side of the rotor core than both circumferential end portion sides; and
the outer radial side apex portion of the refrigerant flow passage hole is located further on a radially outer side than an innermost diameter portion of the magnetic pole portion.

* * * * *